(12) United States Patent
Omar

(10) Patent No.: US 9,112,664 B2
(45) Date of Patent: Aug. 18, 2015

(54) SYSTEM FOR AND METHOD OF DYNAMIC HOME AGENT ALLOCATION

(71) Applicant: Verizon Patent and Licensing, Inc., Basking Ridge, NJ (US)

(72) Inventor: Hassan M. Omar, Mt. Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/094,440

(22) Filed: Dec. 2, 2013

(65) Prior Publication Data

US 2014/0086185 A1     Mar. 27, 2014

Related U.S. Application Data

(63) Continuation of application No. 12/749,912, filed on Mar. 30, 2010, now Pat. No. 8,625,529.

(51) Int. Cl.
| | |
|---|---|
| H04W 4/00 | (2009.01) |
| H04L 5/00 | (2006.01) |
| H04W 72/04 | (2009.01) |
| H04W 72/08 | (2009.01) |
| H04W 72/00 | (2009.01) |
| H04W 8/06 | (2009.01) |
| H04W 80/04 | (2009.01) |

(52) U.S. Cl.
CPC .............. *H04L 5/0058* (2013.01); *H04W 8/065* (2013.01); *H04W 72/00* (2013.01); *H04W 72/04* (2013.01); *H04W 72/044* (2013.01); *H04W 72/048* (2013.01); *H04W 72/08* (2013.01); *H04W 80/04* (2013.01)

(58) Field of Classification Search
CPC ... H04W 72/00; H04W 72/04; H04W 72/044; H04W 72/048; H04W 72/08
USPC ................... 370/331, 248, 238, 329
See application file for complete search history.

(56) References Cited

U.S. PATENT DOCUMENTS

| | | | |
|---|---|---|---|
| 6,430,698 B1 * | 8/2002 | Khalil et al. ................... 714/4.1 |
| 7,006,472 B1 | 2/2006 | Immonen et al. | |
| 7,031,275 B1 | 4/2006 | Borella et al. | |
| 7,376,128 B2 | 5/2008 | Chen et al. | |
| 7,512,093 B2 | 3/2009 | Nakatsugawa et al. | |
| 7,554,929 B1 * | 6/2009 | Omar et al. .................... 370/252 |
| 7,693,093 B2 | 4/2010 | Riedel et al. | |
| 7,747,251 B1 | 6/2010 | Pippert et al. | |
| 7,882,207 B1 * | 2/2011 | Titmuss et al. ............... 709/223 |
| 8,041,898 B2 | 10/2011 | Moga et al. | |
| 8,060,088 B2 | 11/2011 | Ihattula | |
| 8,144,687 B2 | 3/2012 | Bedekar et al. | |
| 8,156,225 B2 | 4/2012 | Yamada et al. | |
| 8,195,807 B2 * | 6/2012 | Bedekar et al. ............... 709/227 |

(Continued)

OTHER PUBLICATIONS

Kulkarni et al, "Mobile IPv4 Dynamic Home Agent (HA) Assignment, RFC 4433," Network Working Group, http://tools.ielf.org/html/rfc4433, pp. 1-25, Mar. 2006.

*Primary Examiner* — Ricky Ngo
*Assistant Examiner* — Dewanda Samuel

(57) ABSTRACT

A system for and method of dynamic home agent allocation is presented. The system and method may include receiving, via a network, a request for allocation of a Logical Home Agent for a mobile node, selecting a Logical Home Agent for the mobile node based on one or more performance metrics, and communicating Logical Home Agent selection to the selected Logical Home Agent and the mobile node.

20 Claims, 5 Drawing Sheets

(56) References Cited

U.S. PATENT DOCUMENTS

| | | |
|---|---|---|
| 2004/0202126 A1 | 10/2004 | Leung et al. |
| 2006/0010250 A1 | 1/2006 | Eisi et al. |
| 2006/0120315 A1* | 6/2006 | Olivereau et al. ............. 370/313 |
| 2006/0285525 A1* | 12/2006 | Sastry ............................ 370/338 |
| 2007/0206556 A1 | 9/2007 | Yegani et al. |
| 2007/0297370 A1 | 12/2007 | Shimizu et al. |
| 2008/0039079 A1 | 2/2008 | Iyer et al. |
| 2008/0069030 A1* | 3/2008 | Hirano et al. ................. 370/328 |
| 2008/0240053 A1* | 10/2008 | Oswal et al. ................... 370/338 |
| 2008/0279150 A1 | 11/2008 | Shousterman et al. |

* cited by examiner

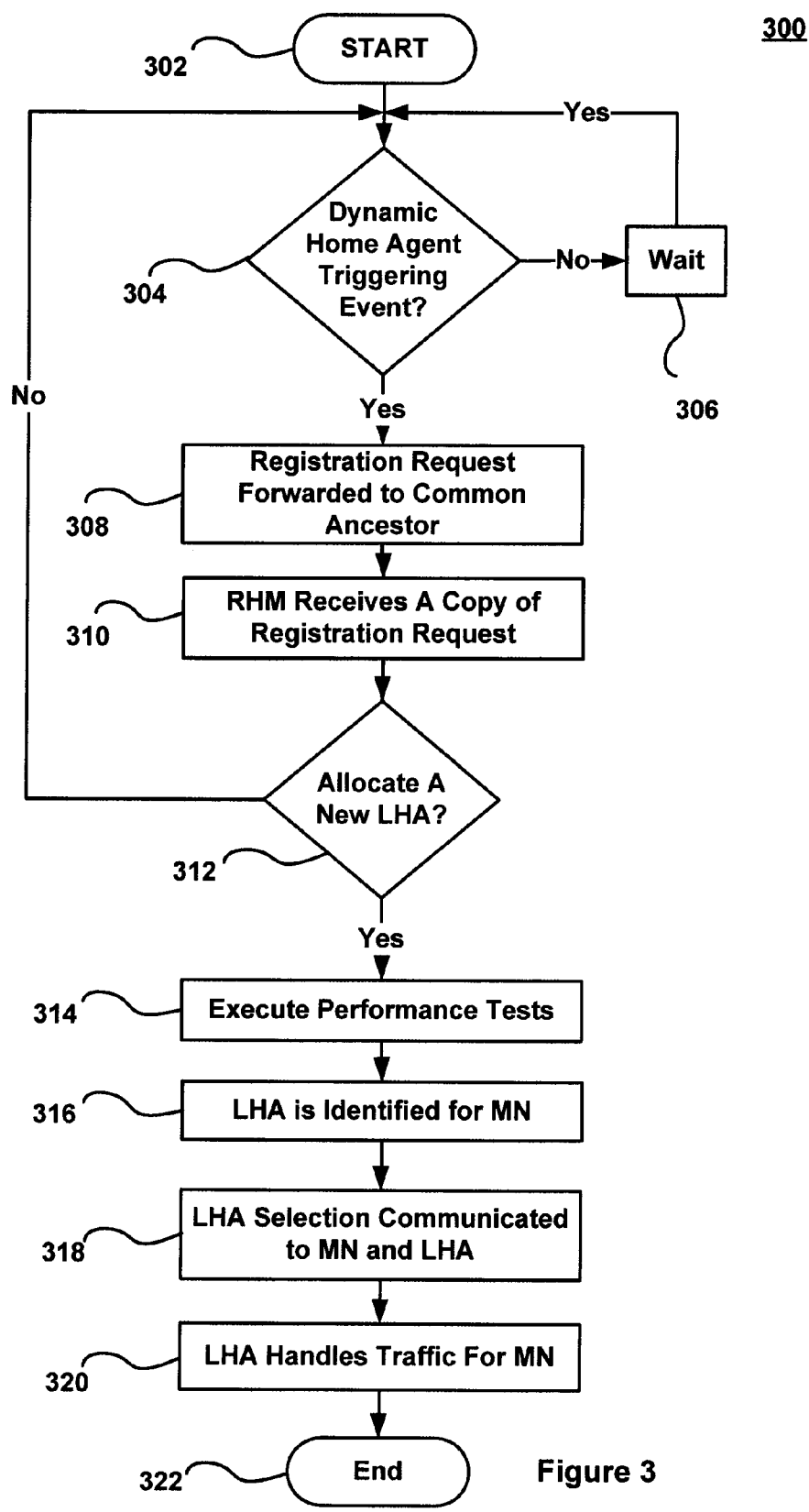

SYSTEM FOR AND METHOD OF DYNAMIC HOME AGENT ALLOCATION

RELATED APPLICATION

This application is a continuation of U.S. patent application Ser. No. 12/749,912, filed Mar. 30, 2010, the disclosure of which is incorporated by reference in its entirety.

BACKGROUND INFORMATION

Users of mobile networking devices travel and transfer from connectivity via a first network to connectivity via a second network. Users prefer a fixed IP address for a number of applications. Protocols such as, for example, Mobile IP, address the need for a fixed IP address across networks. However, such protocols employ sub-optimal routing requiring either routing of network traffic to a home network regardless of the location of a mobile user or modification of all existing correspondent nodes communicating with the mobile user.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 3 depicts a method for performing dynamic home agent allocation, according to a particular embodiment;

DETAILED DESCRIPTION OF PREFERRED EMBODIMENTS

Mobile IP may provide a fixed IP address for one or more mobile clients. Many real-time types of traffic and mission critical applications may require a network to support specified performance metrics. Users may expect a same level of experience even while on the move between different networks and while using the different available wired and wireless access technologies. The Mobile-IP protocol may support the mobility of users without the need to tear down existing sessions. In Mobile-IP, traffic destined to a mobile user may be forwarded to a statically configured home network address to be intercepted by the home agent (HA), and then forwarded to a current foreign agent (FA) that may be providing service to a mobile user. This arrangement may cause sub-optimal routing that may significantly impact performance metrics such as delay, in particular if a mobile user is far away from a home network. In Mobile-IP, network traffic to or from a mobile device may still need to be sent to a home agent on the home network even though the mobile device is now associated with a foreign agent on a different network.

According to an embodiment, a system for and method of dynamic home agent allocation is presented. The system and method may include receiving, via a network, a request for allocation of a Logical Home Agent ("LHA") for a mobile node. The system and method may also include selecting a Logical Home Agent for the mobile node based on one or more performance metrics, and communicating Logical Home Agent selection to the selected Logical Home Agent and the mobile node. The selected Logical Home Agent may then begin forwarding traffic for the mobile node. Selection of a Logical Home Agent may be policy based and may provide flexibility in offering and supporting different levels of service. Logical resource sharing techniques may be used to allow network and service providers to optimize the utilization of existing infrastructure. Such an approach may provide better performance for mobile users when moving into areas with no presence of home network owned resources.

Figure 1:
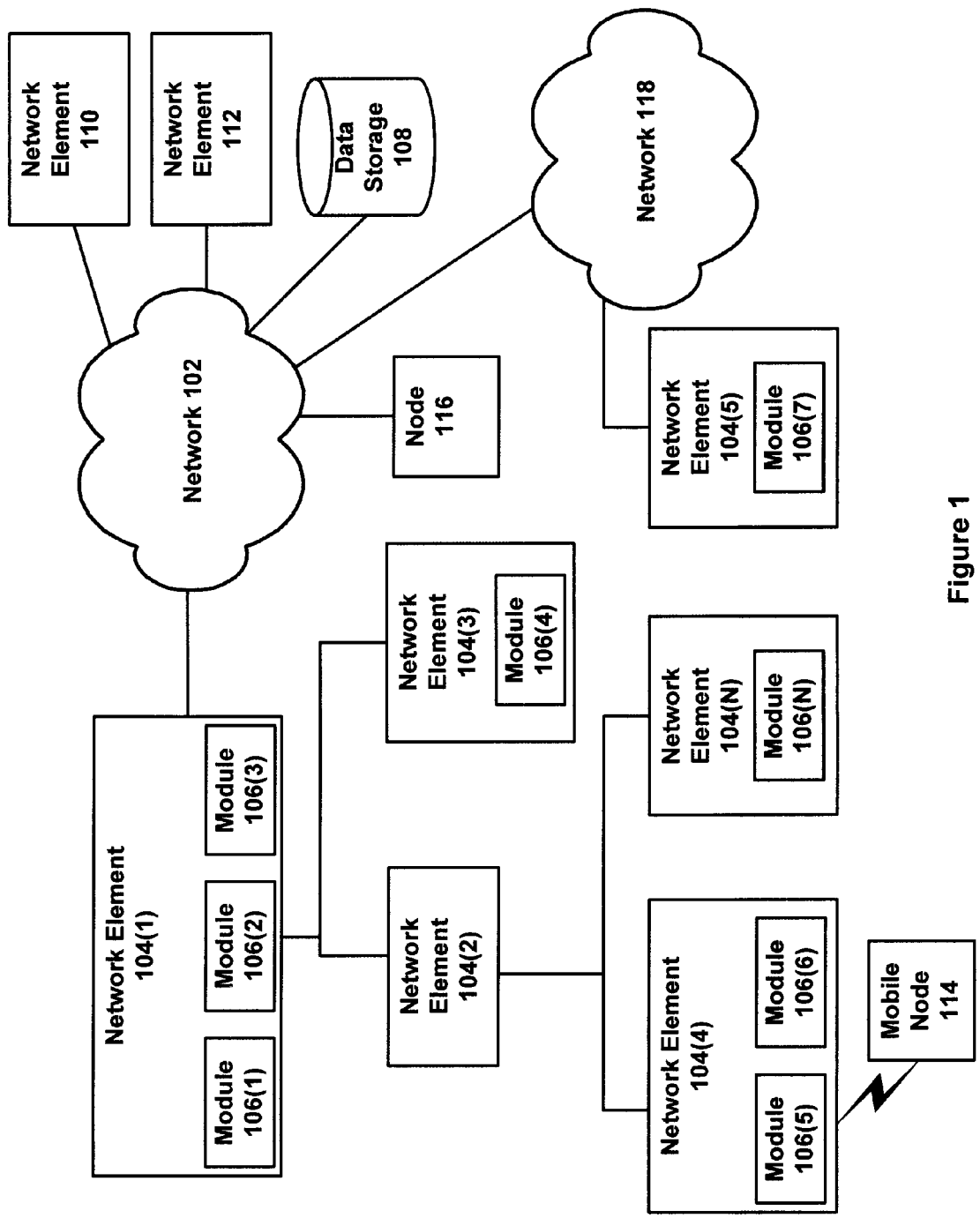
FIG. 1 is a schematic diagram illustrating a system for performing dynamic home agent allocation, according to a particular embodiment.

FIG. 1 is a schematic diagram illustrating a system for performing dynamic home agent allocation, according to a particular embodiment. As illustrated, networks 102 and 118 may be communicatively coupled with each other and with one or more devices including network element 104(1) through network element 104(n), data storage 108, network element 110, network element 112, mobile node 114, and node 116. Network elements 104 may contain modules 106. Other devices may be communicatively coupled with networks 102 and 118 via one or more intermediary devices.

The description below describes network elements, computers, and/or components of a system of and method for performing dynamic home agent allocation that may include one or more modules. As used herein, the term "module" may be understood to refer to executable software, firmware, hardware, and/or various combinations thereof. Modules however are not to be interpreted as software which is not implemented on hardware, firmware, or recorded on a processor readable recordable storage medium (i.e., modules are not software per se). It is noted that the functional separation of the modules is exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Networks 102 and 118 may be one or more of: a wireless network, a wired network or any combination of wireless network and wired network. For example, networks 102 and 118 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, networks 102 and 118 may include, without limitation, telephone line, fiber optics, IEEE Ethernet 802.3, a Wide Area Network ("WAN"), a Local Area Network ("LAN"), or a global network such as the Internet. Also, networks 102 and 118 may support, an Internet network, a wireless communication network, a cellular network, or the like, or any combination thereof.

Networks 102 and 118 may further include one, or any number of the exemplary types of networks mentioned above operating as a stand-alone network or in cooperation with each other. Networks 102 and 118 may utilize one or more protocols of one or more network elements to which it is communicatively coupled. Networks 102 and 118 may translate to or from other protocols to one or more protocols of network devices. Although networks 102 and 118 are each depicted as one network, it should be appreciated that according to one or more embodiments, networks 102 and 118 may each comprise a plurality of interconnected networks, such as, for example, a service provider network, the Internet, a broadcaster's network, a cable television network, corporate networks, and home networks.

Although embodiments of the present disclosure illustrate Mobile IP and a hierarchical configuration, it should be appreciated that concepts in this disclosure are applicable to other models of network topology and other network protocols.

Network elements 104, 110, 112, mobile node 114, and data storage 108 may include one or more processors for recording, transmitting, receiving, and storing data. Although network elements and data storage 108 are depicted as individual elements, it should be appreciated that the contents of one or more of a network element and data storage 108 may be combined into fewer or greater numbers of devices and may be connected to additional devices not depicted in FIG. 1. Furthermore, the one or more devices may be local, remote, or a combination thereof to a first network element and data storage 108.

Network elements 104, 110, 112, mobile node 114, modules 106, and data storage 108 may transmit and receive data to and from networks 102 and 118 representing dynamic home agent allocation data, resource utilization data, packet delay, jitter, packet loss, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. According to at least one embodiment, the data may be transmitted using a Request For Comments ("RFC") 4433 compliant protocol. Data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Networks 102 and 118 may use standard wireless protocols including IEEE 802.11a, 802.11b and 802.11g. Networks 102 and 118 may also use protocols for a wired connection, such as an IEEE Ethernet 802.3.

Mobile node 114 may be a cellular phone, a mobile phone, a satellite phone, a Personal Digital Assistants ("PDA"), a computer, a handheld MP3 player, a handheld video player, a personal media player, a gaming devices, or other devices capable of communicating with networks 102 and 118. According to some embodiments, mobile node 114 may be use Session Initiation Protocol, Voice Over IP, or other protocols to provide network resource sensitive applications. Network resource sensitive applications may include, but is not limited to, gaming, gaming burst software download service, Bandwidth on Demand ("BOD"), Video on Demand ("VoD"), video over IP, IPTV, internet access, Virtual Private Network ("VPN") services, or other performance sensitive services.

Node 116 may be a correspondent node providing or participating in one or more performance sensitive applications. According to some embodiments, node 116 may be a correspondent node in communication with mobile node 114.

Data storage 108 may be network accessible storage and may be local, remote, or a combination thereof to network elements 104, 110, and 112. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

According to some embodiments, data storage 108 may be a relational database, an object oriented database, a flat file, or other electronic storage that may store performance metrics, network topology information (e.g., node information, link information, etc.), bandwidth, utilization, logical home element utilization, QoS ("Quality of Service") profile information, and other resource and utilization data. Data may be aggregated, sorted, processed, and queried to identify memory trends, network connectivity problems, configuration problems, and other issues. Associations may be made between identified issues identified in the diagnostic data and requested QoS levels. According to some embodiments, data storage 108 may provide one or more APIs or other interfaces which may be used by a web server or other application to distribute, present, and share information.

Data storage 108 may be implemented as a standalone unit or as an integrated module within the network element 110 or another network element. Data storage 108 may track information including, but not limited to: links of a network topology, a maximum bandwidth for each link, and current link utilization. Data storage 108 may support topology and configuration intervention, which may accommodate allowing QoS requests that may not be satisfied otherwise.

Network elements 104, 110, and 112 may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information. Network elements 104, 110, and 112 may receive data associated with dynamic home agent allocation, resource utilization, QoS requests, and other network data. This network data may be provided or accessible to other network elements via one or more APIs, services, interfaces, or other data exchange mechanisms.

According to some embodiments, module 106 may be a Logical Home Agent. As illustrated in FIG. 1, a network element may contain one module 106, multiple modules 106, or no modules 106. For example, network element 104(1) may be a gateway foreign agent which may contain modules 106(1), 106(2), and 106(3). Network element 104(2) may not contain any modules 106, network element 104(3) may contain module 106(4), network element 104(4) may contain modules 106(5) and 106(6). A single network element may support multiple modules 106 (e.g., Logical Home Agents), and may utilize resource sharing and logical separation techniques that may allow utilization of existing resources while meeting performance and security requirements requested by clients. Mobile node 114 may be communicatively coupled to module 106(5) of network element 104(5). Module 106(5) may serve as a home agent for mobile node 114. Mobile node 114 may be running a network resource sensitive application such as, for example, video conferencing. Node 116 may be a correspondent node participating in a video conference call with mobile node 116. A user of mobile node 114 may be traveling with mobile node 114 during the video conference call with node 116. Mobile node 114 may require a fixed IP address for the conference call functionality while traveling across networks. Mobile node 114 may utilize Mobile IP or other protocols to maintain a fixed IP address. For example, if mobile node moves from an area with network traffic handled by network element 104(4) to an area where network traffic is handled by network element 104(5), mobile node 114 may maintain a same IP address. If mobile node 114 moves to network element 104(5), network element 104(5) may serve as a foreign agent for mobile node 114. Network element 104(5) may send and receive IP traffic for mobile node 114. In Mobile IP implementations mobile node 114 may have previously been required to send and receive traffic to correspondent node 116 through its home agent, module 106(5). Module 106(5) would then send the network traffic for mobile node 114 to network element 104(5) (e.g., via an IP tunnel). Module 106(5) would also previously send traffic for node 116, which has been received from mobile node 114 at network element 104(5), to node 116.

According to one or more embodiments, a Logical Home Agent may be allocated for mobile node 114 when mobile node 114 moves to a different area. For example, mobile node 114 may transmit a registration request when it moves from module 106(5) to network element 104(5) (e.g., from a home agent to a foreign agent). In addition to triggering a home agent allocation request when a mobile node moves other events may trigger a home agent allocation request. For example, a new QoS requirement may trigger a home agent allocation request. In some situations, the performance requirements associated with a mobile user may change while residing in the same service area without moving. For example, a mobile user may need to engage in a high quality interactive multimedia session with strict delay and jitter requirements. The current home agent may not be able to support such strict requirements. In such a case, selecting a new Logical Home Agent may be warranted. In response, mobile node 114 may transmit a registration request to obtain a home agent capable of handling the new QoS requirement. According to some embodiments, a network element other than mobile node 114 may detect a change in location for mobile node 114 or a change in QoS requirements and may generate a registration request.

Other events may also be considered as a trigger a request for a Logical Home Agent allocation. For example, when a mobile user moves to a new service area, it is possible that this move may impact performance aspects such as, for example, propagation delay due to the distance between a home agent and a new foreign agent. It may be appropriate to verify if a new Logical Home Agent selection can contribute to performance enhancement. Furthermore, it is possible that a new service area may be able to provide additional resources such as, for example, higher bandwidth wireless interfaces. It may also be possible that such new resources, along with a new Logical Home Agent, may provide additional benefits.

As discussed in greater detail with reference to FIGS. 4a and 4b below, a registration request may contain one or more protocol extensions providing data associated with Logical Home Agent allocation requests, preferences, and data. For example, a QoS extension may be used to specify a QoS requirement for mobile node 114. Multiple types of extensions may be used to extend functionality. A registration request may be intercepted by, received by, or forwarded to a network element which may be a common ancestor between a home agent and a foreign agent or between a former foreign agent and a current foreign agent.

For example, a registration request may be received by module 106(3) of network element 104(1) which may serve as a gateway foreign agent. The registration request may then be forwarded to a network element which may provide one or more network resource and home agent management services. For example, when a foreign agent (e.g., a gateway foreign agent or a common ancestor) detects a registration request extension, a copy of the registration request may be forwarded to a network element which may provide one or more network resource and home agent management services. According to one or more embodiments, network element 110 may be a network element configured to provide resource and home agent management. Network element 104(1) may continue to forward network traffic while a registration request is being processed by a network element providing one or more network resource and home agent management services. Thus, any time delay associated with processing a messaging request and selecting a Logical Home Agent may not impact network service for a mobile user.

According to one or more embodiments, network element 110 may be a network element configured to provide resource and home agent management. Network element 110 may receive and handle one or more requests for Logical Home Agent allocation. Network element 110 may utilize performance metrics to process home agent allocation requests. Network element 110 may be a Resource and Home agent Manager ("RHM"). When network element 110 receives a registration request it may parse it to extract data for further processing. For example, network element 110 may identify a QoS requirement in an extension to the registration request (e.g., "Delay from subnet 192.168.1.0 (Correspondent Node subnet) to the mobile user needs to be limited to 20 milliseconds for traffic with IP precedence 5"). Network element 110 may then identify one or more portions of network topology and network resources used by a mobile node and may determine associated performance metrics. Network element 110 may identify a current home agent associated with the mobile node and determine one or more metrics associated with the current home agent. Network element 110 may identify a current path from a correspondent node to the current home agent and determine one or more metrics associated with the current path from the correspondent node to the current home agent. Network element 110 may also identify a current path from a current home agent to a current foreign agent and determine one or more metrics associated with the current path from the current home agent to the current foreign agent. Network element 110 may further identify a current path from a current foreign agent to the mobile node and determine one or more metrics associated with the current path from the current foreign agent to the mobile node. Identified topology, resources, and metrics may be used together with policies or rules to determine current home agent performance.

A distributed Logical Home Agent arrangement may be used to efficiently support a Logical Home Agent selection function. Network element 110 may collect input from the mobile users, different network elements in a topology, and a performance monitoring module (e.g., network element 112). Network element 110 may compile the collected information and apply a set of configurable rules (e.g., policy based rules) to identify a Logical Home Agent which is appropriate to serve a mobile node.

Metrics associated with network topology and resources may be retrieved from data storage 108. Network element 110 may inspect metrics received from data storage 108 to determine if they are valid. Validity may be based on a timestamp associated with performance metrics. For example, if a timestamp associated with a performance metric for portion of network topology indicates that the metric is greater than a specified age, network element 110 may request performance testing of the portion of network topology. According to some embodiments, network element 112 may perform one or more requested performance tests and obtain other metrics. Network element 112 may provide metrics to data storage 108 and network element 110. Once network element 110 has received one or more metrics associated with a current network topology associated with a mobile node (e.g., a current home agent and one or more current network paths used to support a mobile node), network element 110 may determine whether current network resources and network topology associated with a mobile node may meet one or more QoS requirements for the mobile node. For example, network element 110 may determine whether the forwarding delay in sending network traffic to a home agent (e.g., module 106(5)) for mobile node 114 fails to meet a QoS requirement after mobile node 114 moves to a foreign agent (e.g., network element 104(5)). Performance metrics evaluated by network element 110 may include measurements of delay, jitter, packet loss, and other network performance characteristics. Network element 110 may also evaluate a load on one or more network resources such as, for example, network element 104(4). Network element 110 may apply one or more rules. If one or more QoS requirements for mobile node 114 may not be met by current network resources and topology, network element 110 may begin selecting a new Logical Home Agent. If one or more QoS requirements for mobile node 114 may be met by current network resources and topology, network element 110 may ignore a request for a Logical Home Agent allocation (e.g., an extension to a QoS request). Network element 110 may continue forwarding received network traffic for mobile node 114.

If it is determined that a Logical Home Agent should be assigned for mobile node 114, network element 110 may begin reviewing performance metrics to determine if a Logical Home Agent is available that may meet one or more QoS requirements for mobile node 114. Network element 110 may obtain performance metrics from data storage 108 and may determine if one or more Logical Home Agents and portions of network topology may meet QoS requirements for mobile node 114. If performance metrics received from data storage 108 are not valid (e.g., they are expired), network element 110 may request one or more performance tests from a performance monitoring module (e.g., network element 112), which may be responsible for managing test implementation. According to some embodiments, data storage 108, network element 112, or another network element may request one or more performance tests at periodic intervals, upon detection of expiration of a performance metric, in response to a user request, or based on other network factors.

When evaluating one or more potential Logical Home Agents and network resources to allocate to a mobile node (e.g., mobile node 114), network element 110 may evaluate a Logical Home Agent status and utilization. For example, network element 110 may evaluate the status and utilization of module 106(3) which may be a potential Logical Home Agent for mobile node 114 when mobile node 114 is associated with network element 104(5) (e.g., using network element 104(5) as a foreign agent). Network element 110 may attempt to optimize load sharing among one or more Logical Home Agents. Network element 110 may determine whether a potential Logical Home Agent may support expected processing and forwarding loads associated with supporting one or more mobile nodes. Network element 110 may evaluate bandwidth of one or more paths, links, or other portions of network topology associated with a Logical Home Agent and the impact of the addition of a mobile node to such topology. Network element 110 may determine whether expected or estimated delay or other performance metrics are within limits of QoS requirements for mobile node 114. If multiple potential Logical Home Agents are identified, network element 110 may determine an optimum Logical Home Agent. If no potential Logical Home Agents are identified, a current home agent may be maintained and the request for a Logical Home Agent allocation may be ignored. Traffic forwarding may continue as before. If a Logical Home Agent is identified, network element 110 may notify the Logical Home Agent (e.g., module 106(3)) and the mobile node (e.g., mobile node 114). The Logical Home Agent may accept registration for the mobile node and the Logical Home Agent may begin forwarding traffic to the mobile node. For example, if mobile node 114 moves to network element 104(5) as a foreign agent, network element 110 may identify module 106(3) as a Logical Home Agent. Network traffic between node 116 (e.g., a correspondent node) and mobile node 114 (now at network element 104(5)) may be handled by module 106(3) instead of routing it all the way to module 106(5) (the former home agent). This may improve performance for network traffic between mobile node 114 and node 116 and relieve an unnecessary load on network topology between network element 104(1) and network element 104(4).

According to some embodiments, a request for a Logical Home Agent allocation may indicate one or more specified preferences. Additionally a request for Logical Home Agent allocation may identify a profile to be used (e.g., a QoS profile). A QoS profile may be shared among one or more mobile nodes and may indicate QoS preferences and other settings. For example, changing a Logical Home Agent serving a particular mobile user may impact a currently active communication session between the different hosts and the mobile user. Accordingly, a mobile user profile may include a preference regarding the criteria of when to allow or to postpone a pending Logical Home Agent change events. Examples of such criteria include, but are not limited to, the frequency of changing of a Logical Home Agent and the last time a Logical Home Agent was changed. A profile may indicate a preference to postpone a transition to a new Logical Home Agent until a number of active sessions is less than a specified threshold. Additionally, a profile may identify a particular stream or set of streams that identify traffic that should not be impacted by a Logical Home Agent change event. In such as case, Logical Home Agent change may be placed on hold until specified streams are no longer active.

Other criteria to identify critical traffic may be possible, including, for example, application type, source/destination IP, and QoS marking. A mobile user may desire that a Logical Home Agent change is considered only when a specific QoS criteria can not be met using the current home agent. For example, a profile may identify that a Logical Home Agent change is warranted only if the specified delay requirements can not be satisfied. But, in this example, Logical Home Agent change may not be warranted if the objective meets packet loss requirements.

According to some embodiments, Logical Home Agents may be shared. For example, logical partitioning and resource sharing may be implemented such that a service provider may maximize the use of existing infrastructure and resources while offering an affordable attractive service to the clients. Instead of dedicating separate physical network element to support individual home networks, existing foreign agent platforms may be used to serve multiple clients while maintaining acceptable traffic separation features satisfying common security requirements. As discussed with further detail in reference to FIG. 5 below, multiple Logical Home Agents may be supported on a single platform by sharing system resources like memory and CPU.

Although embodiments of the present disclosure illustrate Logical Home Agents, it should be appreciated that concepts in this disclosure are applicable to other approaches as well (e.g., non-Logical Home Agents).

The various components of system 100 as shown in FIG. 1 may be further duplicated, combined and/or integrated to support various applications and platforms. Additional elements may also be implemented in the systems described above to support various applications.

Figure 2:
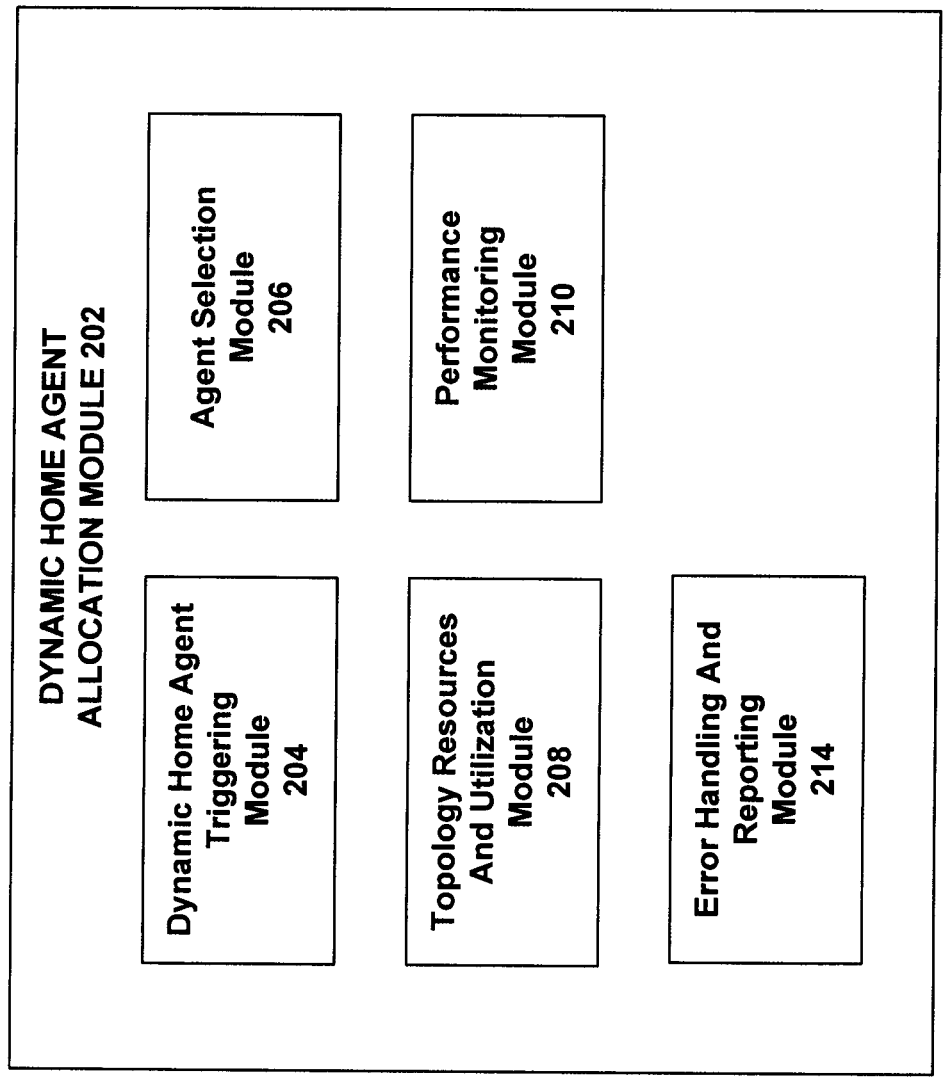
FIG. 2 is a block diagram of a hardware component of the system for performing dynamic home agent allocation, according to a particular embodiment.

FIG. 2 is a block diagram of a hardware component of the system for performing dynamic home agent allocation, according to a particular embodiment. As illustrated, the dynamic home agent allocation module 202 may contain one or more components including dynamic home agent triggering module 204, agent selection module 206, topology resources and utilization module 208, performance monitoring module 210, and error handling and reporting module 214. Although dynamic home agent allocation module 202 is depicted as a single module, functionality or modules of dynamic home agent allocation module 202 may be located on a single device or distributed across a plurality of devices including one or more centralized servers and one or more pieces of customer premises equipment or end user devices.

Dynamic home agent triggering module 204 may detect one or more conditions indicating a potential performance improvement to be gained by allocating a Logical Home Agent for a mobile node. According to one or more embodiments, dynamic home agent triggering module 204 may initiate a Logical Home Agent allocation determination when a mobile node moves to a different area. According to one or more embodiments, dynamic home agent triggering module 204 may receive a registration request from mobile node 114 when mobile node 114 moves from module 106(5) to network element 104(5) (e.g., from a home agent to a foreign agent). Dynamic home agent triggering module 204 may also trigger a home agent allocation request for other events. For example, a new QoS requirement may trigger a home agent allocation request. In some situations, the performance requirements associated with a mobile user may change while residing in the same service area without moving. For example, a mobile user may need to engage in a high quality interactive multimedia session with strict delay and jitter requirements. The current home agent may not be able to support such strict requirements. In such a case, selecting a new Logical Home Agent may be warranted. Dynamic home agent triggering module 204 may receive a registration request from mobile node 114 to obtain a home agent capable of handling the new QoS requirement.

Agent selection module 206 may provide resource and home agent management. Agent selection module 206 may receive and handle one or more requests for Logical Home Agent allocation. Agent selection module 206 may utilize performance metrics to process home agent allocation requests. Agent selection module 206 may be a Resource and Home agent Manager. When agent selection module 206 receives a registration request it may parse it to extract data for further processing. For example, agent selection module 206 may identify a QoS requirement in an extension to the registration request (e.g., "Delay from subnet 192.168.1.0 (Correspondent Node subnet) to the mobile user needs to be limited to 20 milliseconds for traffic with IP precedence 5").

After receiving a registration request, agent selection module 206 may identify one or more portions of network topology and network resources used by a mobile node and may determine associated performance metrics. Agent selection module 206 may identify a current home agent associated with the mobile node and determine one or more metrics associated with the current home agent. Agent selection module 206 may identify a current path from a correspondent node to the current home agent and determine one or more metrics associated with the current path from the correspondent node to the current home agent. Agent selection module 206 may also identify a current path from a current home agent to a current foreign agent and determine one or more metrics associated with the current path from the current home agent to the current foreign agent. Agent selection module 206 may further identify a current path from a current foreign agent to the mobile node and determine one or more metrics associated with the current path from the current foreign agent to the mobile node.

Agent selection module 206 may inspect metrics received from topology resources and utilization module 208 to determine if they are valid. Validity may be based on a timestamp associated with performance metrics. For example, if a timestamp associated with a performance metric for portion of network topology indicates that the metric is greater than a specified age, agent selection module 206 may request performance testing of the portion of network topology. Once agent selection module 206 has received one or more metrics associated with a current network topology associated with a mobile node (e.g., a current home agent and one or more current network paths used to support a mobile node), agent selection module 206 may determine whether current network resources and network topology associated with a mobile node may meet one or more QoS requirements for the mobile node. For example, agent selection module 206 may determine whether delay in sending network traffic to a home agent (e.g., module 106(5)) for mobile node 114 fails to meet a QoS requirement after mobile node 114 moves to a foreign agent (e.g., network element 104(5)). Performance metrics evaluated by agent selection module 206 may include measurements of delay, jitter, packet loss and other network performance characteristics.

Agent selection module 206 may also evaluate a load on one or more network resources such as, for example, network element 104(4). Agent selection module 206 may apply one or more rules. If one or more QoS requirements for mobile node 114 may not be met by a current network resources and topology or load sharing optimization suggests the consideration of a new Logical Home Agent, agent selection module 206 may begin selecting a new Logical Home Agent. If one or more QoS requirements for mobile node 114 may be met by a current network resources and topology, agent selection module 206 may ignore a request for a Logical Home Agent allocation (e.g., an extension to a QoS request). Agent selection module 206 may continue forwarding received network traffic for mobile node 114.

If it is determined that a Logical Home Agent should be assigned for mobile node 114, agent selection module 206 may begin reviewing performance metrics to determine if a Logical Home Agent is available that may meet one or more QoS requirements for mobile node 114. Agent selection module 206 may determine obtain performance metrics from topology resources and utilization module 208 and may determine if one or more Logical Home Agents and portions of network topology may meet QoS requirements for mobile node 114. If performance metrics received from topology resources and utilization module 208 are not valid (e.g., they are expired), agent selection module 206 may request one or more performance tests from performance monitoring module 210. According to some embodiments, topology resources and utilization module 208, performance monitoring module 210, or another network element may request one or more performance tests at periodic intervals, upon detection of expiration of a performance metric, in response to a user request, or based on other network factors.

When evaluating one or more potential Logical Home Agents and network resources to allocate to a mobile node (e.g., mobile node 114), agent selection module 206 may evaluate a Logical Home Agent status and utilization. For example, agent selection module 206 may evaluate the status and utilization of module 106(3) which may be a potential Logical Home Agent for mobile node 114 when mobile node 114 is associated with network element 104(5) (e.g., using network element 104(5) as a foreign agent). Agent selection module 206 may attempt to optimize load sharing among one or more Logical Home Agents.

Topology resources and utilization module 208 may store, retrieve, and provide one or more metrics associated with network topology and resources.

According to some embodiments, topology resources and utilization module 208 may be or may use a relational database, an object oriented database, a flat file, or other electronic storage that may store performance metrics, network topology information (e.g., node information, link information, etc.), bandwidth, utilization, logical home element utilization, QoS profile information, and other resource and utilization data. Data may be aggregated, sorted, processed, and queried to identify memory trends, network connectivity problems, configuration problems, and other issues. Associations may be made between identified issues identified in the diagnostic data and requested QoS levels. According to some embodiments, topology resources and utilization module 208 may provide one or more APIs or other interfaces which may be used by a web server or other application to distribute, present, and share information.

According to some embodiments, performance monitoring module 210 may perform one or more requested performance tests and obtain other metrics. Performance monitoring module 210 may provide metrics to topology resources and utilization module 208 and agent selection module 206.

Error handling and reporting module 214 may handle one or more errors associated with dynamic home agent allocation. Error handling and reporting module 214 may provide alerts or messages to administrators in the event of an error. Error handling and reporting module 214 may produce one or more reports including diagnostic test result reports and corrective action reports. Error handling and reporting module 214 may produce log files, formatted reports, and electronic communications.

FIG. 3 depicts a method for performing dynamic home agent allocation, according to a particular embodiment. At block 302, the method 300 for dynamic home agent allocation may begin.

At block 304, it may be determined whether a dynamic home agent triggering event has occurred. For example, one or more conditions may be detected indicating a potential performance improvement to be gained by allocating a Logical Home Agent for a mobile node. For example, a mobile node may move to a different area. According to one or more embodiments, a registration request from a mobile node may be received when the mobile node moves from a home agent to a foreign agent. Other events may also provide a dynamic home agent triggering event. For example, a new QoS requirement may trigger a home agent allocation request. In some situations, the performance requirements associated with a mobile user may change while residing in the same service area without moving. For example, a mobile user may need to engage in a high quality interactive multimedia session with strict delay and jitter requirements. The current home agent may not be able to support such strict requirements. In such a case, selecting a new Logical Home Agent may be warranted. A registration request may be received from mobile node 114 to obtain a home agent capable of handling the new QoS requirement. If a dynamic home agent triggering event has been received, the method 300 may continue at block 308. If a dynamic home agent triggering event has not been received the method may continue at block 306.

At block 306, the method may wait a specified period of time before returning to block 304.

At block 308, a registration request may be forwarded to a common ancestor or other network node capable of handling foreign agent registration requests. If a foreign agent registration request is received, it may be examined to determine whether a protocol extension such as, for example, a QoS request extension is contained in the request. If a protocol extension is contained in the request indicating a request for Logical Home Agent allocation, the registration request may be forwarded to a Resource and Home agent Manager network element. At block 310, a Resource and Home Agent manager network element may receive the registration request. The RHM network element may parse the request and identify one or more QoS requirements. The RHM network element may identify a current home agent and one or more portions of network topology associated with a requesting mobile node. The RHM network element may obtain one or more performance metrics associated with a current home agent and network topology of a requesting mobile node.

At block 312, the method 300 may determine whether a new Logical Home Agent should be allocated. The determination may be based on one or more of performance metrics associated with a current home agent, performance metrics associated with network topology, and QoS requirements for a mobile node. If a new Logical Home Agent is to be allocated, the method 300 may continue at block 314. If a new Logical Home Agent is not to be allocated the method 300 may return to block 304.

At block 314, one or more performance tests may be executed. Performance tests may identify bandwidth, network congestion, load, delay, jitter, packet loss, and other performance characteristics of a potential Logical Home Agent and network topology (e.g., links) associated with a potential Logical Home Agent.

At block 316, a Logical Home Agent may be identified for the requesting mobile node. The Logical Home Agent selection may be communicated to the mobile node and the Logical Home Agent at block 318. At block 320, the identified Logical Home Agent may begin handling traffic for the mobile node.

At block 322, the method may end.

Figure 4A:
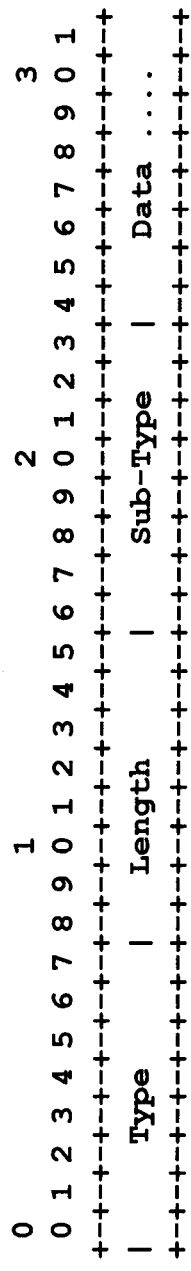
FIG. 4a illustrates an exemplary protocol extension for performing dynamic home agent allocation requests, according to an embodiment of the disclosure.

FIG. 4a illustrates an exemplary protocol extension for performing dynamic home agent allocation requests, according to an embodiment of the disclosure. As illustrated in FIG. 4a, an exemplary protocol extension to Mobile IP may include an eight bit type field. An exemplary value may be "217" which may indicate a QoS Request Extension message. Another eight bits of the protocol extension may be allocated for a length field. The length field may indicate the length of the extension in bytes. An additional eight bits may be reserved for a sub-type field. A sub-type field may contain a "1" to indicate a resource request and a "2" to indicate a resource reply. Bits twenty-four to thirty-one of the exemplary protocol extension may be reserved for a data field. The data field may contain details regarding the QoS request. Exemplary data field contents may include:

Resource request ID (e.g., 1 byte);
Requesting entity (e.g., 1 byte, 1=Mobile Node);
QoS profile length (e.g., 2 bytes, structure length);
QoS profile map (e.g., 2 bytes, QoS Profile map);
QoS profile data (e.g., variable);
QoS profile id;
Requested Allocation Type (e.g., 1 Byte, 1=IP Source, 2=IP Destination, 3=Differentiated Services Code Point (DSCP) or IP precedence marking);
Requested resource direction (e.g., 1 byte, 1=upstream, 2=downstream, 3=upstream & downstream);
Address/subnet for source (e.g., 8 bytes);
Address/subnet for destination (e.g., 8 bytes);
Resource marking upstream (e.g., 1 byte, Differentiated Services Code Point (DSCP) or IP precedence value);
Resource marking downstream (e.g., 1 byte, Differentiated Services Code Point (DSCP) or IP precedence value);
One or Performance aspect code and value (e.g., 1 byte code, 4 bytes value);
QoS requirement scope (e.g., 1 byte, 1=Correspondent Node to Mobile Node, 2=Home Agent to Mobile Node, 3=Gateway Foreign Agent to Mobile Node); and
Desired Logical Home Agent address (e.g., 4 bytes).

This extension may allow a mobile user to supply information related to the desired QoS requirement using a QoS profile. The mobile user may identify a QoS requirement for all or a subset of the traffic. An example is a mobile user identifying performance aspect code=2 (delay performance aspect) and value=20000 microseconds as the maximum allowed delay. The mobile user may identify IP subnet (e.g., 192.168.1.0) and mask (e.g., 255.255.255.0) or other network parameters to limit the number of source IP addresses subjected to a QoS requirement. Additionally, to accommodate more complicated QoS profiles and to allow for more flexibility, the mobile user may include a QoS profile ID. The provided QoS profile ID may be mapped by a Resource Home agent Manager (RHM) network element to detailed QoS requirements. This feature may provide more efficiency, relieve a mobile user from collecting detailed requirements, and may also facilitate sharing profiles between multiple mobile users. The QoS extension may also allow for specification of a desired Logical Home Agent address. Although the Logical Home Agent selection extension also allows for specifying a desired IP address, having the option of including a desired Logical Home Agent IP address in the QoS extension may add additional flexibility in associating Logical Home Agents with QoS profiles, and may also facilitate supporting mobile users with multiple IP addresses.

Figure 4B:
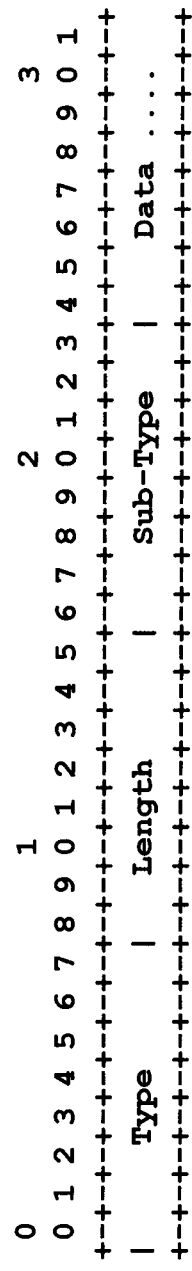
FIG. 4b illustrates an exemplary protocol extension for indicating dynamic home agent allocation preferences, according to an embodiment of the disclosure.

FIG. 4b illustrates an exemplary protocol extension for indicating dynamic home agent allocation preferences, according to an embodiment of the disclosure. As illustrated in FIG. 4b, an exemplary protocol extension to Mobile IP may include an eight bit type field. An exemplary value may be "219" which may indicate a home agent selection extension message. Another eight bits of the protocol extension may be allocated for a length field. The length field may indicate the length of the extension in bytes. An additional eight bits may be reserved for a sub-type field. A sub-type field may contain a "1" to indicate a home agent selection request and a "2" to indicate a home agent selection reply. Bits twenty-four to thirty-one of the exemplary protocol extension may be reserved for a data field. The data field may contain details regarding the home agent selection request. Exemplary data field contents may include:

Home agent selection enabled/disabled (1 byte); and
Desired home agent address/subnet (8 bytes)

Figure 5:
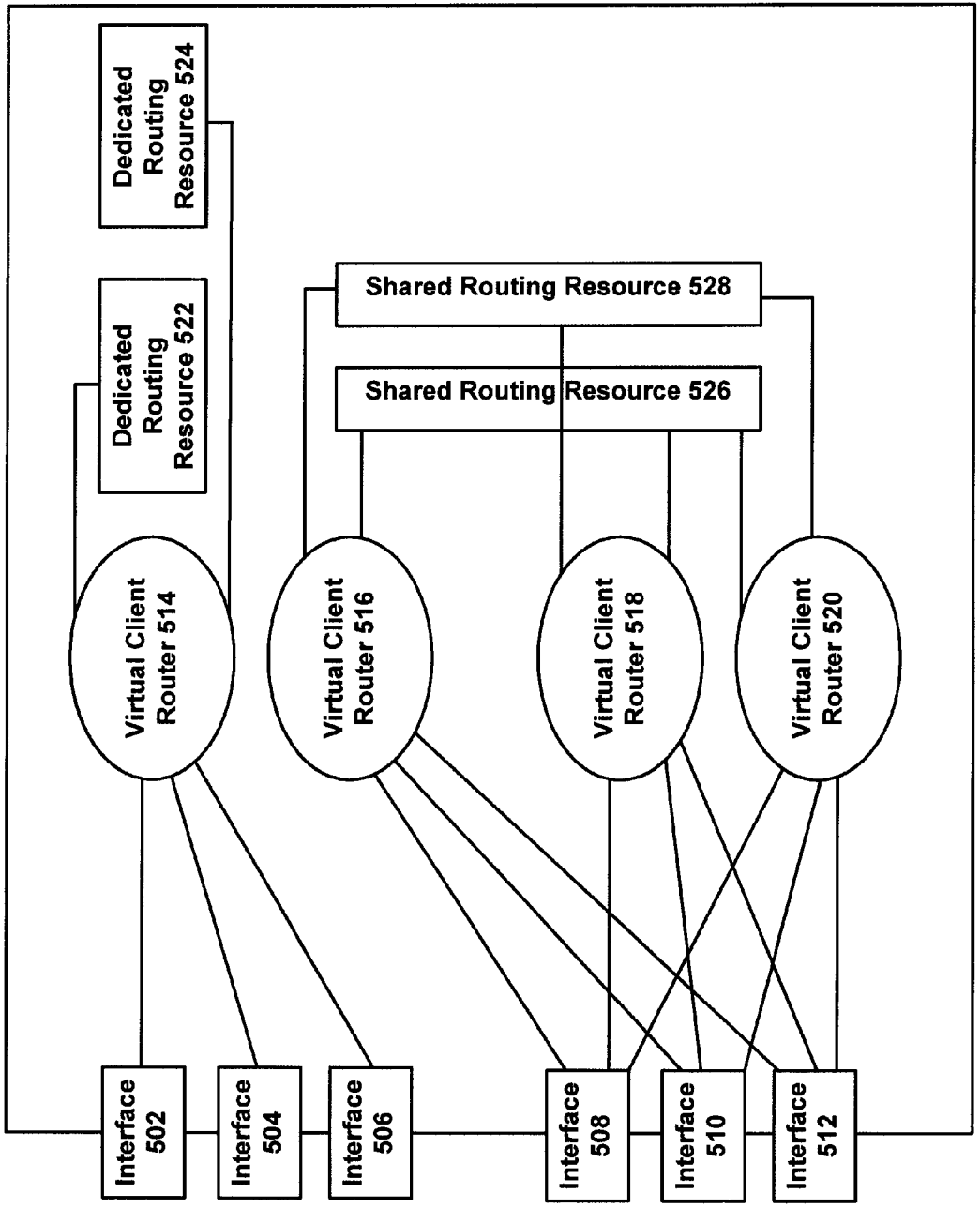
FIG. 5 is a schematic diagram of a system for performing dynamic home agent allocation, according to an embodiment of the disclosure.

FIG. 5 is a schematic diagram of a system for performing dynamic home agent allocation, according to an embodiment of the disclosure. The home agent function is typically hosted on a system that resides on the home network of the mobile users. In this situation, the home agent hardware is dedicated to one client. In the case of hosted home agent function, it may not be efficient to dedicate a separate physical system for each client. To improve efficiency, a Logical Home Agent function may be supported using shared resources. Multiple Logical Home Agents may be supported on a single platform by sharing system resources such as, for example, memory and CPU. For example, a Logical Home Agent serving client-A may be allocated a dedicated 1 Gigabyte of memory. Client-B may share a 3 Gigabyte memory pool with five other clients (client-c to client-g) for example. A service provider may associate different rates to different allocation configurations which meet individual client needs. Other resources such as, for example, CPU cycles and storage space may be allocated using similar approaches. The amount of dedicated resources and the maximum amount that may be allocated and used by a particular client may be tailored to provide a differentiated service aspect.

To address security issues, logical separation techniques can be used. Concepts such as, for example, virtual routing domains, may create a logically dedicated system partition for each client, providing traffic separation features.

As illustrated in FIG. 5, a single platform may support a plurality of clients such as, for example, virtual client router 514, virtual client router 516, virtual client router 518, and virtual client router 520. The first client, client virtual client router 514, may have strict requirements regarding dedicated resources, and may be willing to pay for a premium service. Accordingly a service provider may dedicate resources for this particular client. Dedicated routing resource 522 may represent a dedicated portion of a resource type (e.g., memory) and may be dedicated for virtual client router 514. Similarly, dedicated routing resource 524 may represent a dedicated portion of a second type of resource (e.g., CPU resources) that may be dedicated to a same client, virtual client router 514. From an implementation point of view, dedicated resources may be supported by tagging a hardware module as dedicated for a client. Modular systems may support such partitioning. For example, dedicated CPU resources may be allocated by adding a CPU board to support a particular client. Furthermore, client virtual client router 514 may select to use a dedicated network interface ports for ingress and egress traffic (e.g., interfaces 504 and 506). According to some embodiments, virtual client router 514 may have a dedicated management interface (e.g., interface 502). Virtual client routers 516, 518, and 520 may share ingress, egress, and management ports interfaces 508, 510, and 512. Shared routing resources 526 and 528 may be routing resources (e.g., CPU, memory) shared among a plurality of clients (e.g., virtual client routers 518 and 520).

Virtual client router 516, virtual client router 518, and virtual client router 520 may have less strict requirements regarding resources such that a provider may allocate pools of shared memory and CPU resources for those clients. Within this shared model, a provider may still set rules to differentiate between virtual client router 516, virtual client router 518, and virtual client router 520 and the amount of resources available to each. An example of such rules is:

The total amount of shared routing resource 526 allocated to virtual client router 516+virtual client router 518+virtual client router 520=Four Gigabytes Instantaneous Resources of shared routing resource 526 for virtual client router 516 can not exceed 50% of shared routing resource 526.

Instantaneous Resources of shared routing resource 526 for virtual client router 518 can not exceed 30% of shared routing resource 526.

Instantaneous Resources of shared routing resource 526 for virtual client router 520 can not exceed 20% of shared routing resource 526.

Such rules may ensure having a boundary that limits allocation for each client. This may allow a company to share resources among business groups or other entities and apportion costs to each. It may also allow a service provider to offer a hosted home agent service. A home agent service provider may offers clients (home networks) a logical dynamic home agent service over an agreed-on geographical area. Mobile users that belong to the clients may be authorized to receive home agent service from those Logical Home Agents. Clients (home networks) supporting mobile users that typically roam across different foreign networks may be able to provide their mobile users with dynamic home agent selection options that may allow for support of better QoS. This may improve performance for real time and other services with strict performance requirements. Additionally, users of a hosted home agent service may be able to avoid the technical resources to create and manage a dedicated network supporting home agent selection. Furthermore, a cost associated with deploying and operating a dedicated set of home agents for a single client may be prohibitive. This may allow for the distribution of the costs among several users. Service providers may be able to offer multiple levels of service and performance that may correspond to a user's needs. The costs may correspond to the level of resource usage.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

I claim:

1. A method, comprising:
receiving a request for allocation of a logical home agent for a mobile node in response to detecting a dynamic home agent triggering event, wherein the registration request comprises at least one Quality of Service (QoS) requirement;
identifying a current home agent and at least one network resource capable of acting as a logical home agent;
obtaining at least one performance metric associated with the current home agent and at least one performance metric associated with the at least one network resource, wherein obtaining the at least one performance metric comprises:
receiving at least one stored performance metric associated with the at least one network resource;
determining a validity of the at least one stored performance metric;
performing, in response to determining an invalid at least one stored performance metric, one or more performance tests to determine at least one updated performance metric; and
substituting the at least one updated performance metric for the at least one stored performance metric;
determining whether the current home agent performance metric or at least one network resource performance metric meets the at least one QoS requirement; and
assigning at least one of the current home agent or the at least one network resource as a logical home agent based on the determination.

2. The method of claim 1, wherein a dynamic home agent triggering event is selected from the group comprising: a new QoS requirement, a change in a QoS requirement, a change in a current home agent performance metric, and a new service area event.

3. The method of claim 2, wherein a new service area event comprises at least one of: a propagation delay due to the distance between the home agent and a new foreign agent and an increase in network bandwidth.

4. The method of claim 1, wherein the at least one QoS requirement comprises at least one of bandwidth, network congestion, load, delay, jitter, and packet loss.

5. The method of claim 1, wherein determining a validity of the at least one stored performance metric comprises comparing a timestamp to a predetermined threshold timestamp and wherein the at least one stored performance metric is invalid when the timestamp is less than the predetermined threshold timestamp.

6. The method of claim 1, wherein the registration request further comprises a QoS request extension.

7. The method of claim 1, wherein the registration request further comprises a desired logical home agent address.

8. The method of claim 1, wherein the registration request further comprises a QoS profile.

9. The method of claim 8, wherein the QoS profile is shared between one or more potential logical home agents.

10. A system, comprising:
a network element, wherein the network element comprises one or more processors configured to:
receive a request for allocation of a logical home agent for a mobile node in response to detecting a dynamic home agent triggering event, wherein the registration request comprises at least one Quality of Service (QoS) requirement;
identify a current home agent and at least one network resource capable of acting as a logical home agent;
obtain at least one performance metric associated with the current home agent and at least one performance metric associated with the at least one network resource, wherein obtaining the at least one performance metric comprises:
receiving at least one stored performance metric associated with the at least one network resource;
determining a validity of the at least one stored performance metric;
performing, in response to determining an invalid at least one stored performance metric, one or more performance tests to determine at least one updated performance metric; and
substituting the at least one updated performance metric for the at least one stored performance metric;
determine whether the current home agent performance metric or at least one network resource performance metric meets the at least one QoS requirement; and
assign at least one of the current home agent or the at least one network resource as a logical home agent based on the determination.

11. The system of claim 10, wherein a dynamic home agent triggering event is selected from the group comprising: a new QoS requirement, a change in a QoS requirement, a change in a current home agent performance metric, and a new service area event.

12. The system of claim 11, wherein a new service area event comprises at least one of: a propagation delay due to the distance between the home agent and a new foreign agent and an increase in network bandwidth.

13. The system of claim 10, wherein the at least one QoS requirement comprises at least one of bandwidth, network congestion, load, delay, jitter, and packet loss.

14. The system of claim 10, wherein determining a validity of the at least one stored performance metric comprises comparing a timestamp to a predetermined threshold timestamp and wherein the at least one stored performance metric is invalid when the timestamp is less than the predetermined threshold timestamp.

15. A system, comprising:
a communication module configured to receive, via a network, a request for allocation of a logical home agent for a mobile node in response to detecting a dynamic home agent triggering event, wherein the registration request comprises at least one Quality of Service (QoS) requirement;
network accessible data storage configured to store at least one performance metric associated with a current home agent and at least one performance metric associated with at least one network resource;
a performance monitoring module configured to execute performance tests and receive data associated with the at least one current home agent performance metric and the at least one network resource performance metric; and
a logical home agent determination module configured to:
identify a current home agent and at least one network resource capable of acting as a logical home agent;
obtain the at least one performance metric associated with the current home agent and the at least one performance metric associated with the at least one network resource, wherein if the at least one performance metric associated with the current home agent and the at least one performance metric associated with the at least one network resource is invalid, the performance monitoring module executes a performance test to update the at least one performance metric associated with the at least one network resource with valid data;
determine whether the current home agent performance metric or the at least one network resource performance metric meets the at least one QoS requirement; and
assign at least one of the current home agent or the at least one network resource as a logical home agent based on the determination.

16. The system of claim 15, wherein a dynamic home agent triggering event is selected from the group comprising: a new QoS requirement, a change in a QoS requirement, a change in a current home agent performance metric, and a new service area event.

17. The system of claim 16, wherein a new service area event comprises at least one of: a propagation delay due to the distance between the home agent and a new foreign agent and an increase in network bandwidth.

18. The system of claim 15, wherein the at least one QoS requirement comprises at least one of bandwidth, network congestion, load, delay, jitter, and packet loss.

19. A method, comprising:
receiving, via a network, a request for allocation of a logical home agent for a mobile node in response to detecting a dynamic home agent triggering event, wherein the registration request comprises at least one Quality of Service (QoS) requirement;
storing at least one performance metric associated with a current home agent and at least one performance metric associated with at least one network resource;
executing performance tests and receive data associated with the at least one current home agent performance metric and the at least one network resource performance metric; and
identifying a current home agent and at least one network resource capable of acting as a logical home agent;
obtaining the at least one performance metric associated with the current home agent and the at least one performance metric associated with the at least one network resource, wherein if the at least one performance metric associated with the current home agent and the at least one performance metric associated with the at least one network resource is invalid, another performance test is executed to update the at least one performance metric associated with the at least one network resource with valid data;
determining whether the current home agent performance metric or the at least one network resource performance metric meets the at least one QoS requirement; and
assigning at least one of the current home agent or the at least one network resource as a logical home agent based on the determination.

20. The method of claim 19, wherein the at least one QoS requirement comprises at least one of bandwidth, network congestion, load, delay, jitter, and packetloss.

* * * * *